United States Patent [19]

Furukawa et al.

[11] Patent Number: 4,874,725

[45] Date of Patent: * Oct. 17, 1989

[54] HIGH-DENSITY SINTERED ARTICLE OF SILICON CARBID

[75] Inventors: Mitsuhiko Furukawa; Takashi Kitahira; Sakae Tanaka; Kiyohito Misumi, all of Fukuoka, Japan

[73] Assignee: Nippon Tungsten Co., Ltd., Fukuoka, Japan

[*] Notice: The portion of the term of this patent subsequent to Aug. 22, 2006 has been disclaimed.

[21] Appl. No.: 129,856

[22] Filed: Dec. 4, 1987

Related U.S. Application Data

[63] Continuation of Ser. No. 912,162, Sep. 24, 1986, abandoned, which is a continuation of Ser. No. 748,652, Jun. 25, 1985, abandoned.

[51] Int. Cl.$^4$ .............................................. C04B 35/56
[52] U.S. Cl. ...................................... 501/89; 501/88; 501/91; 501/152
[58] Field of Search ...................... 501/88, 89, 152, 91

[56] References Cited

U.S. PATENT DOCUMENTS

| | | | |
|---|---|---|---|
| 3,836,673 | 9/1974 | Weaver et al. | 501/91 OR |
| 3,853,566 | 12/1974 | Prochazka | 501/88 OR |
| 3,998,646 | 12/1976 | Weaver | 501/89 |
| 4,041,117 | 8/1977 | Prochazka | 264/63 OR |
| 4,123,286 | 10/1978 | Coppola et al. | 501/90 OR |
| 4,211,758 | 7/1980 | Buhrer | 501/152 X |
| 4,372,902 | 2/1983 | Denton et al. | 501/88 X |
| 4,502,983 | 3/1985 | Omori et al. | 501/89 X |
| 4,564,490 | 1/1986 | Omori et al. | 501/88 X |
| 4,569,921 | 2/1986 | Omori et al. | 501/152 X |

FOREIGN PATENT DOCUMENTS

| | | | |
|---|---|---|---|
| 0064279 | 4/1983 | Japan | 501/89 |
| 0064280 | 4/1983 | Japan | 501/89 |
| 60-5073 | 6/1983 | Japan . | |
| 1478898 | 7/1977 | United Kingdom . | |
| 1558254 | 12/1979 | United Kingdom . | |

OTHER PUBLICATIONS

R. Alliegro et al., Journal of the American Ceramic Society, vol. 39, pp. 386-389, (1956).
Prochayka et al., Journal of the American Ceramic Society, Bulletin, vol. 52, pp. 885-891, (1973).
Alliegro et al., "Pressure Sintered Silicon Carbide", J. of Am. Cer. Soc., vol. 39, pp. 386-389, (1956).
Prochazka et al., "Strength of Boron-Doped Hot--Pressed Silicon Carbide", Am. Cer. Soc. Bull., vol. 52, pp. 885-891, (1973).

Primary Examiner—William R. Dixon, Jr.
Assistant Examiner—Karl Group
Attorney, Agent, or Firm—Jordan and Hamburg

[57] ABSTRACT

A sintered article of silicon carbide containing 2 to 12% by weight of erbium oxide, not more than 2% by weight of aluminum oxide, existing in the form of a composite oxide exhibits remarkable characteristics in resisting to oxidation, thermal shock and corrosion, and shows increased strength at elevated temperatures due to their effect to compaction of resulting structure of the sintered article due to retaining fineness of crystal grains. Those meritorious effects can be enhanced by adding to the aforementioned composition 0.5 to 6.0% by weight of at least one element selected from among titanium, vanadium, chromium, manganese, magnesium, yttrium, zirconium, niobium, molybdenum, barium, lanthanum, cerium, gadolinium, hafnium, tantalum, tungsten, thorium, and cesium or a compound of this element.

11 Claims, 1 Drawing Sheet

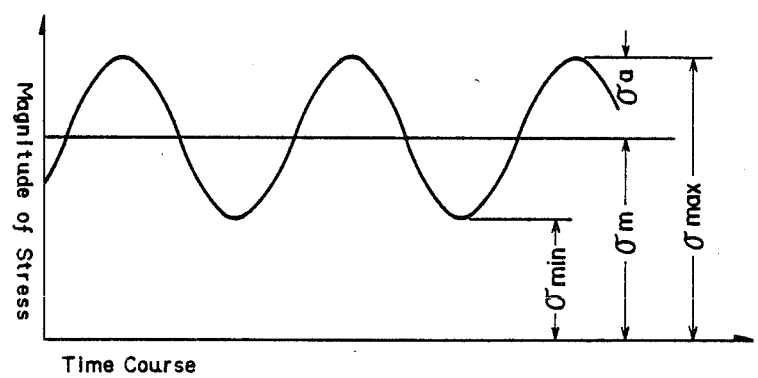

HIGH-DENSITY SINTERED ARTICLE OF SILICON CARBID

This application is a continuation of application Ser. No. 912,162 filed Sept. 24, 1986, abandoned, which is a continuation of Ser. No. 748,652 filed June 25, 1885, abandoned.

BACKGROUND OF THE INVENTION

1. Field of the Invention

This invention relates to a sintered article of silicon carbide exhibiting resistance to oxidation, resistance to thermal shock, resistance to corrosion, and strength at elevated temperatures and, at the same time, possessing high density.

2. Description of the Prior Art

In recent years, sintered articles of silicon carbide, owing to their feature of excelling in resistance to oxidation, resistance to thermal shock, resistance to corrosion, and strength at elevated temperatures, have come to find growing utility in applications to various structural materials, check valves and sealing members designed to handle corrosive liquids, heat-exchanger members for high-temperature furnaces, members expected to withstand heavy friction. Even the desirability of sintered articles which are substantially devoid of pore and are stronger has come to find recognition.

As methods of producing such silicon carbide, (A) chemical vapor deposition (CVD), (B) reaction sintering, and (C) conventional sintering have been known. The method of (A) is capable of producing homogeneous and compact silicon carbide generally only in the form of film and, therefore, is practically, barely suitable for the purpose of coating various materials. The method of (B) which comprises sintering a compact of silicon carbide powder or a mixed powder of silicon dioxide and silicon carbide is capable of producing articles of large dimensions but low density. Therefore, this method is now applied only to production of refractories and heat generators. For the production of sintered articles of large dimensions and high density, the method of (C) is considered as the optimum means.

Incidentally, silicon carbide, which is a compound of high covalent bond property and, therefore, is hard, tough, and stable at elevated temperatures, exhibits very poor sintering property and does not permit easy production of sintered articles when conventional sintering process is applied. Many studies have been being reported concerning adding various sintering aids to improve its sintering property of silicon carbide powder. For example, R. Alliegro et al. Journal of the American Ceramic Society, Vol. 39, pp. 386–389 (1956), the specifications of Japanese Patent Laid-open Publication Nos. 49-007311, 49-099308, 50-078609, 51-065000, 53-067711, and 53-084013 disclose the effect of use of Al, Fe, B, $B_4C$, etc. as sintering aids permits production of sintered articles showing low pore contents and high strength.

The strength of sintered articles is effected greatly by the factors of (A) porosity, (B) surface flaw, and (C) grain size. The problem of porosity of (A) can be remarkably solved by using various sintering aids as mentioned above. Although, the sintered articles so produced by the incorporation of such sintering aids, contain extents of microscopic pores. Causing of said (B) surface flaw can be avoided by payment of careful attention to fabrication. The problem caused by the factor from grain size of (C) is most difficult, because of grain growth during the course of sintering, and difficulty of retaining the starting fine grains during the course of sintering. This inevitable growth of grains constitutes itself the cause for the failure of sintered articles to acquire strength beyond a certain limit. This fact is reported by S. Prochazka et al., Am. Caramic Soc. Bull. 52, 885–891 (1973) purporting to conclude that owing to growth of crystal grains, the produced sintered articles fail to acquire any appreciable improvement in strength when using B as a sintering aid.

With a view to eliminating the drawback mentioned above, the inventors have already disclosed that a sintered article of silicon carbide containing erbium oxide and aluminum oxide as an independent composition shows features of high density and extremely fine size of crystal grains in the filed Japanese Patent Application No. 58-190361. Even the sintered article still contains pores measuring approximately 2 $\mu$m and is recognized as coarse as 8.5 $\mu$m. Thus, the need of producing sintered articles of silicon carbide possessing still higher density and containing crystal grains of still finer size still remains yet to be satisfied.

SUMMARY OF THE INVENTION

An object of this invention is to provide a high-density sintered article of silicon carbide containing finer pores and possessing more compact texture than the conventional sintered article of silicon carbide. Specifically, this invention aims to provide a high-density sintered article of silicon carbide containing pores measuring not more than 1.0 $\mu$m and crystal grains measuring not more than 5 $\mu$m.

The other and further objects and characteristics of this invention will become apparent from the further disclosure of this invention to be made in the following detailed description of a preferred embodiment, with reference to the accompanying drawing.

BRIEF DESCRIPTION OF THE DRAWING

The drawing attached hereto is an explanatory diagram illustrating a high-temperature fatigue test conducted in Example 6.

DETAILED DESCRIPTION OF THE INVENTION

The sintered article of silicon carbide of the present invention has erbium oxide and aluminum oxide contained therein in the form of a composite oxide.

To cite a typical example of the composite oxide, they may be contained in the form of a garnet of the following formulas.

$$Er_3(Al, Er)_2(AlO_4)_3 \qquad (1)$$

$$(Er, Al)_3Al_2(AlO_4)_3 \qquad (2)$$

As the garnet powder represented by the aforementioned formula (1)–(2), a polycrystalline powder obtained by mixing aluminum oxide powder with erbium oxide powder and subjecting the produced mixed powder to a solid-phase reaction at elevated temperatures (generally about 1300° to 1600° C.) can be used, for example.

Such solid-phase reaction described above does not always give rise to a product of the composition $Er_3Al_2(AlO_4)_3$. Often, the two powdered oxides undergo mutual substitutive solid solution and give rise to garnets of the compositions indicated in (1) and (2) above. Otherwise, a garnet of the composition $Er_3Al_2(AlO_4)_3$ can be used. Besides such garnets, a composition represented by the formula $Er_xAl_{(1-x)}O_3$ (wherein $x<1$) can be used.

The amount of erbium oxide in the composite oxide must be at least 21% by weight. If this amount falls short of the lower limit just mentioned, the density of the sintered article based on the theoretical value is insufficient and bending rupture and other properties become inferior. If this amount is as large as 15% by weight, growth of crystal grains is observed to occur and, as the result, the magnitudes of bending rupture and impact value are lowered and most of the other properties are liable to be impaired. Thus, this amount is not allowed to exceed 12% by weight.

As concerns the amount of aluminum oxide, if the amount reaches 3% by weight, the properties such as breaking strength are observed to decline. If this amount is nil, the effect of the addition of a garnet formed jointly of erbium oxide and aluminum oxide is completely absent. Thus, the amount is desired not to exceed 2% by weight.

Although the mechanism of compaction of the structure by this composite oxide remains yet to be elucidated, it is considered that the low energy of activation is made the composite oxide to undergo solid solution in silicon carbide and consequently promote the sintering of silicon carbide.

This invention further embraces the addition of 0.5 to 6.0% by weight of at least one element selected from the group of components indicated below or its varying compound such as oxide, nitride, boride, or carbide, as an agent for promoting the compaction of sintered article. Concrete examples of the element possessing the aforementioned function include titanium, vanadium, chromium, manganese, magnesium, yttrium, zirconium, niobium, molybdenum, barium, lanthanum, cerium, gadolinium, hafnium, tantalum, tungsten, thorium, and cesium.

The second additive element so used for promoting the sintering proves virtually effectless if the amount of this element added is 0.3% by weight, and is required to be at least 0.5% by weight. If this amount is as large as 6% by weight, the crystal grains are observed to grow in size and the properties of the sintered article are degraded. The effect of the added element upon the compaction of the sintered article has not yet been fully elucidated. It has been experimentally ascertained to the inventors that this added element synergistically cooperates with the aforementioned composite oxide to decrease microscopic pores to a great extent.

Optionally, part of silicon carbide may be substituted with Be, BeO, B, or $B_4C$. When this substitution is effected, the addition of a proper amount of the composite oxide of erbium oxide and aluminum oxide enables the produced sintered article to acquire a compact structure formed of extremely fine grains. If the amount of substitution is not more than 0.5% by weight, the effect of the added element is substantially nil. If the amount is as large as 3.0% by weight, however, the bending rupture and the hardness of the sintered silicon carbide are observed to decrease. Thus, the amount of substitution must not exceed 2% by weight and is desired to fall in the range of 0.5 to 2% by weight.

It has also been ascertained experimentally that the results of the present invention are not affected at all even when silicon carbide contains 0.5 to 2% by weight of free carbon.

In the manufacture of the sintered article according to this invention, the composite oxide, the agent for promoting the sintering, etc. are required to be uniformly dispersed in silicon carbide.

For the manufacture of the sintered article according to this invention, the conventional sintering method such as hot press method or HIP method can be advantageously utilized. In order to obtain compact and strong sintered articles, the hot pressure temperature is required to exceed 1900° C. If this temperature is as high as 2100° C., however, growth of grains occurs heavily and excessive growth of grains sets in before the compaction of structure proceeds sufficiently and, as the result, pores persist in the produced sintered article. For the purpose of the hot press method, the pressure has only to exceed 100 kg/cm$^2$ to be sufficient. No upper limit is specifically fixed for this pressure. The sintering can be carried out effectively in a vacuum or in an atmosphere of inactive gas. In the case of the HIP method, the sintering is desired to be carried out in an atmosphere of inactive gas. Even by the normal sintering method, the sintered article can be produced in substantially the same quality. When the sintering is performed in the atmosphere of inactive gas without application of pressure, the temperature falls in the range of 2050° to 2300° C. In the atmosphere of compressed gas under 10 atm, the temperature falls in the range of 2000° to 2250° C.

EXAMPLES

Example 1

First, aluminum oxide powder of purity of 99.9% and average particle diameter of 0.4 μm and erbium oxide powder of purity of 99.9% and average particle diameter of 0.8 μm were mixed in a varying ratio indicated in Table 1. The mixed powder was heated at 1300° to 1600° C. for three to ten hours to synthesize a garnet. The garnet was finely ground to an average grain size of 0.5 μm. The garnet powder was mixed with silicon carbide powder of purity of 98.5% and average grain size of 0.5 μm and magnesium oxide powder of purity of 99.9% and average grain size of 1 μm in a varying ratio indicated in Table 1. The resultant composition was wet-pulverized in a ball mill mixer for 15 hours and then dried thoroughly to prepare a raw material for sintering. A graphite mold the square of 50 mm in area and 60 mm in height was packed with the raw material and inserted in a high-frequency coil. The raw material was held at 1950° C. under 200 kg/cm$^2$ of pressure for 60 minutes and then relieved of pressure and left cooling off. As the result, a sintered article 50×50×5.5 mm in size was obtained. The sintered article so obtained was cut and ground with a diamond cutting tool to be 10 test pieces 3×4×36 mm. These test pieces were tested for various properties. The results are shown in Table 1.

The test pieces were visually examined to test for structure. Coarse pores measuring about 2 μm are indicated by the mark X and fine pores measuring not more than 1 μm by the mark G.

TABLE 1-1

| | | | (Example) | | | | | | | | |
|---|---|---|---|---|---|---|---|---|---|---|---|
| | Run No. | | 1 | 2 | 3 | 4 | 5 | 6 | 7 | 8 | 9 |
| Mixing ratio (% by weight) | SiC | | 97 | 95 | 94 | 93 | 90 | 86 | 84 | 83 | 81 |
| | MgO | | 3 | 3 | 3 | 3 | 3 | 3 | 3 | 3 | 3 |
| | Garnet | $Al_2O_3$ | — | 1 | 1 | 2 | 2 | 1 | 1 | 2 | 1 |
| | | $Er_2O_3$ | — | 1 | 2 | 2 | 5 | 10 | 12 | 12 | 15 |
| | $Al_2O_3$ | | — | — | — | — | — | — | — | — | — |
| | $Er_2O_3$ | | — | — | — | — | — | — | — | — | — |
| Relative density (%) | | | 74.9 | 87.2 | 98.8 | 98.9 | 99.1 | 99.1 | 99.3 | 99.1 | 95.3 |
| Grain size (μm) | | | 1.0 | 3.5 | 3.5 | 4.0 | 4.0 | 4.5 | 4.0 | 4.5 | 8.5 |
| Bending rupture strength (kg/mm$^2$) | | | 20 | 41 | 84 | 88 | 88 | 88 | 85 | 83 | 63 |
| Charpy impact value (kg·m/cm$^2$) | | | 0.06 | 0.11 | 0.24 | 0.25 | 0.25 | 0.25 | 0.25 | 0.25 | 0.22 |
| Hardness ($H_R$ 30N) | | | — | 86.0 | 93.9 | 94.0 | 95.5 | 95.1 | 95.3 | 95.0 | 93.8 |
| Pore size (G, X) | | | X | X | G | G | G | G | G | G | X |

TABLE 1-2

| | | (Comparative experiment) | | | |
|---|---|---|---|---|---|
| | Run No. | | 10 | 11 | 12 |
| Mixing ratio (% by weight) | SiC | | 94 | 90 | 86 |
| | MgO | | 3 | 3 | 3 |
| | Garnet | $Al_2O_2$ | — | — | — |
| | | $Er_2O_3$ | — | — | — |
| | $Al_2O_3$ | | 1 | 2 | 1 |
| | $Er_2O_3$ | | 2 | 5 | 10 |
| Relative density (%) | | | 97.7 | 97.9 | 98.8 |
| Grain size (μm) | | | 3.5 | 7.0 | 7.5 |
| Bending rupture strength (kg/mm$^2$) | | | 81 | 82 | 79 |
| Charpy impact value (kg·m/cm$^2$) | | | 0.20 | 0.23 | 0.23 |
| Hardness ($H_R$ 30N) | | | 93.5 | 93.8 | 93.7 |
| Pore size (G, X) | | | X | X | X |

Example 2

Same test pieces in Example 1 were cut with a diamond cutting tool to be a plate 10×10×5 mm in size. Those plates were given to surface polishing with #200 grit diamond. And the polished surface, 10×10 mm, of the plate was blasted with abrasive grits (METCOLITE C, No. 40) blown at a distance of 50 mm under air pressure of 5 kg/cm$^2$ by a sand blasting machine provided with a nozzle 8 mm in inside diameter, to test for weight loss. The results are shown in Table 2.

TABLE 2

| Run No. | 1 | 2 | 4 | 5 | 8 | 9 |
|---|---|---|---|---|---|---|
| Loss of weight, g/(cm$^3$·hr) | 2.03 | 0.98 | 0.65 | 0.60 | 0.60 | 1.11 |

Example 3

Same test pieces in Example 1 were out with a diamond cutting tool to obtain a plate 10×10×5 mm in size. All the surfaces of this plate were wrapped with #200 grit diamond. The test piece thus prepared was left standing at 1300° C. for 20 hours in air, to test for weight increase per unit area. The results are shown in Table 3.

TABLE 3

| Run No. | 1 | 2 | 4 | 5 | 8 | 9 |
|---|---|---|---|---|---|---|
| Weight increase × 10$^{-7}$ g/mm$^2$ | 15.0 | 5.2 | 0.4 | 0.3 | 0.3 | 6.7 |

Example 4

Same test pieces in Example 1 were cut with a diamond paste to obtain a rod 3×4×36 mm in size. All the surfaces of this rod were wrapped with a diamond paste. The test pieces so prepared were subjected to Charpy impact test at 950° C. in the atmosphere. The results are shown in Table 4.

TABLE 4

| Run No. | 1 | 2 | 4 | 5 | 8 | 9 |
|---|---|---|---|---|---|---|
| Impact strength at elevated temperatures, kg·cm$^2$ | 0.08 | 0.22 | 0.42 | 0.42 | 0.43 | 0.21 |

Example 5

Same test pieces in Example 1 were directly subjected to high-temperature fatigue test. Specifically, with a flex tester, the samples are held in the position by the single point loading method with the span distance of 20 mm under the atmospheric pressure at 1000° C. in air stress cycles 1325 CTM. The repeated stress were applied in a pattern as illustrated in the accompanying drawing, under the conditions such as to satisfy $\sigma_{max}=15$ kg/cm$^2$ and i=0.73 wherein $\sigma_{max}$ denotes the upper limit of repeating stress, $\sigma_{min}$ denotes the lower limit of repeating stress, $\sigma_m$ denotes the average stress, $\sigma_a$ denotes the amplitude of stress, and i denotes the ratio of $\sigma_a/\sigma_m$. The results are shown in Table 5.

TABLE 5

| Run No. | 1 | 2 | 4 | 5 | 8 | 9 |
|---|---|---|---|---|---|---|
| Flexible fatigue number of cycle | 9.8 ×10$^2$ | 0.8 ×10$^4$ | 8.2 ×10$^4$ | 4.7 ×10$^5$ | 5.6 ×10$^5$ | 0.6 ×10$^4$ |

Example 6

First, 10% by weight of aluminum oxide powder of purity of 99.9% and average grain size of 0.4 μm and 90% by weight of erbium oxide powder of purity of 99.9% and average grain size of 0.8 μm were mixed. The mixed powder was heated at 1400° C. for five hours to synthesize a garnet. The garnet so obtained was finely ground to average grain size of 0.5 μm. The resultant fine powder used in an amount of 10% by weight, a varying second additive element for promotion of sintering used in a varying amount indicated in Table 6, and the balance to make up 100% by weight of silicon carbide of purity of 98.5% and average grain size of 0.5

μm were wet pulverized in a ball mill mixer for 15 hours. From the resultant composition, a sintered articles were produced by same procedure in Example 1. The sintered article was tested for various properties. The results are shown in Table 6.

TABLE 6

| Second additive element for promoting sintering compound/amount (% by weight) | Relative density (%) | Grain size (μm) | Bending rupture strength (kg/mm$^2$) | Charpy impact value (kg.m/cm$^2$) | Hardness (H$_R$ 30N) |
|---|---|---|---|---|---|
| TiO$_2$/0.3 | 98.0 | 4.0 | 81 | 0.23 | 94.7 |
| Cr$_2$O$_3$/0.5 | 98.5 | 4.0 | 83 | 0.24 | 95.1 |
| MnO$_2$/3 | 98.9 | 4.5 | 83 | 0.25 | 95.0 |
| MgO/0.3 | 98.1 | 4.5 | 81 | 0.23 | 94.6 |
| MgO/0.5 | 98.5 | 4.5 | 84 | 0.24 | 95.0 |
| MgO/3.0 | 99.0 | 4.5 | 88 | 0.25 | 95.0 |
| MgO/6.0 | 99.1 | 5.0 | 84 | 0.25 | 94.6 |
| MgO/7.0 | 98.8 | 6.0 | 71 | 0.23 | 92.2 |
| Y$_2$O$_3$/0.3 | 98.0 | 4.5 | 79 | 0.22 | 94.5 |
| Y$_2$O$_3$/0.5 | 98.6 | 4.5 | 83 | 0.25 | 95.3 |
| Y$_2$O$_3$/3.0 | 98.9 | 4.5 | 87 | 0.24 | 94.9 |
| Y$_2$O$_3$/6.0 | 99.0 | 5.0 | 84 | 0.25 | 95.0 |
| Y$_2$O$_3$/7.0 | 98.8 | 6.5 | 72 | 0.22 | 92.3 |
| ZrSiO$_4$/3 | 99.2 | 4.5 | 85 | 0.25 | 95.0 |
| Nb$_2$O$_3$/3 | 99.4 | 4.5 | 83 | 0.24 | 95.2 |
| Mo/1.BaO/1 La$_2$O$_3$/0.5 | 99.0 | 4.5 | 86 | 0.25 | 94.9 |
| CeO$_2$/2 W/0.5 | 99.4 | 4.5 | 83 | 0.24 | 95.2 |
| Sm$_2$O$_3$/0.5 | 99.2 | 5.0 | 87 | 0.26 | 94.8 |

Example 7

A part of silicon carbide powder used for sintering was substituted with Be, BeO, B, or B$_4$C.

First, aluminum oxide powder of purity of 99.9% and average grain size of 0.4 μm and erbium oxide powder of purity of 99.9% and average grain size of 0.8 μm were mixed in a varying ratio indicated in Table 7. The powder mixtures were heated at 1300° to 1600° C. for three to ten hours to synthesize a garnet. Then, the garnet so obtained was finely ground to average grain size of 0.5 μm. The finely ground garnet powder was mixed with silicon carbide powder of purity of 98.5% and average grain size of 0.5 μm and magnesium oxide powder of purity of 99.9% and average grain size of 1 μm in a varying ratio indicated in Table 7. The composition was wet pulverized in a ball mill mixer for 15 hours. Then by following the procedure of Example 1, the raw material so prepared was subjected to hot press sintering at 1950° C. The sintered article consequently produced was tested for various properties. The results are shown in Table 7.

Sintered articles of silicon carbide, according to this invention, as described in above examples, shows increased density by the addition of the composite oxide of aluminum oxide and erbium oxide and an element capable of promoting the sintering, and toughness by making the crystal grain size below 5 μm to be very fine, and decreasing the size of pores below 1 μm.

In contrast, in the cases of using mixed powder consisting of aluminum oxide and erbium oxide as shown in above comparative experiments in Table 1-2, the pores contained in the sintered article are increased being as 2 μm.

MERITORIOUS EFFECTS OF INVENTION

Thus, the sintered article of this invention, is preferably applicable to structural materials and abrasive materials which are expected to offer high resistance to oxidation, thermal shock, and corrosion and retain high strength at elevated temperatures.

Since the sintered article contemplated by the present invention can be manufactured by the hot press method or the HIP method, it can be obtained easily in a large size. Even when the sintered article of this invention is manufactured by the normal sintering method, it acquires substantially the same quality as when it is manufactured by the hot press sintering method.

What is claimed is:

TABLE 7

| Mixing ratio Garnet | | (% by weight) | | SiC | Relative density (%) | Grain size (μm) | Bending rupture strength (kg/mm$^2$) | Charpy impact value (kg · m/cm$^2$) | Hardness (H$_R$ 30)N |
|---|---|---|---|---|---|---|---|---|---|
| Al$_2$O$_3$ | Er$_2$O$_3$ | MgO | Additive | | | | | | |
| 2 | 3 | 3 | — | bal. | 97.5 | 6.0 | 79 | 0.22 | 93.6 |
| 2 | 3 | 3 | 0.5 B | bal. | 98.5 | 4.0 | 84 | 0.24 | 95.6 |
| 2 | 3 | 3 | 3.0 B | bal. | 98.3 | 5.0 | 75 | 0.21 | 94.8 |
| 2 | 5 | 3 | 0.5 B$_4$C | bal. | 98.3 | 5.0 | 86 | 0.24 | 95.3 |
| 2 | 5 | 3 | 3.0 B$_4$C | bal. | 98.6 | 5.5 | 78 | 0.23 | 94.5 |
| 2 | 5 | 3 | 1.5 Be | bal. | 98.6 | 4.0 | 85 | 0.25 | 95.3 |
| 2 | 5 | 3 | 3.0 Be | bal. | 97.3 | 5.5 | 57 | 0.22 | 95.0 |
| 2 | 10 | 3 | 0.5 BeO | bal. | 98.6 | 4.5 | 85 | 0.25 | 95.4 |
| 2 | 10 | 3 | 3.0 BeO | bal. | 97.0 | 6.0 | 73 | 0.22 | 95.4 |
| 2 | 10 | 3 | 1.0 BeO 1.0 B | bal. | 98.0 | 5.0 | 85 | 0.24 | 96.0 |

1. A high-density sintered article for use as a structural material which is exposed to elevated temperatures, comprising silicon carbide and a composite oxide, said composite oxide consisting essentially of erbium oxide and aluminum oxide, said composite oxide being in the form of a powder obtained by grinding a garnet synthesized from said erbium oxide and said aluminum oxide, said silicon carbide and composite oxide being mixed to form a mixture to be sintered to form said article, the amount of said erbium oxide being 2 to 12% and the amount of said aluminum oxide being more than 0% and up to 2%, said percentages being percentages by weight of said mixture, the size of the pores of the article not exceeding 1.0 μm, the size of the crystal grains of the article not exceeding 5 μm, and the relative density of said article not being less than 98.8%.

2. A high-density sintered article according to claim 1 further comprising an additive selected from the group consisting of Be, BeO, B and B$_4$C, said additive being added to said mixture to be sintered.

3. A high-density sintered article according to claim 2, wherein the total weight of said additive is from 0.5 to 2% weight percent of said mixture.

4. A high-density sintered article according to claim 1 further comprising an additive selected from the group consisting of titanium, vanadium, chromium, manganese, magnesium, yttrium, zirconium, niobium, molybdenum, barium, lanthanum, cerium, gadolinium, hafnium, tantalum, tungsten, thorium, and cesium, and compounds thereof.

5. A high-density sintered article according to claim 4, wherein the total weight of said additive is from 0.5 to 6% weight percent of said mixture.

6. A method of making a high-density sintered article for use as a structural material which is exposed to elevated temperatures, comprising mixing erbium oxide and aluminum oxide to form a mixture thereof, heating said mixture to synthesize a garnet, grinding said garnet to form a powder, mixing said powder with silicon carbide to form a composition containing 2 to 12% erbium oxide and more than 0% and up to 2% aluminum oxide, and sintering said composition to form said sintered article, said percentages being percentages by weight of said composition, the size of the pores of the article not exceeding 1.0 μm, the size of the crystal grains of the article not exceeding 5 μm, and the relative density of said article not being less than 98.8%.

7. A method according to claim 6 further comprising adding to said composition to be sintered an additive selected from the group consisting of Be, BeO, B and B$_4$C.

8. A method according to claim 7, wherein said additive is from 0.5 to 2% weight percent of the total weight of said composition.

9. A method according to claim 6 further comprising adding to said composition to be sintered an additive selected from the group consisting of titanium, vanadium, chromium, manganese, magnesium, yttrium, zirconium, niobium, molybdenum, barium, lanthanum, cerium, gadolinium, hafnium, tantalum, tungsten, thorium, and cesium, and compounds thereof.

10. A method according to claim 9, wherein said additive is from 0.5 to 6% weight percent of the total weight of said composition.

11. A high-density sintered article made according to the method of claim 6.

* * * * *